(12) United States Patent
Foege

(10) Patent No.: US 7,287,338 B2
(45) Date of Patent: Oct. 30, 2007

(54) GAUGE FOR MEASURING GUN DIMENSIONS

(76) Inventor: Robert L. Foege, 31 Shepard Hill Rd., Newtown, CT (US) 06470

(*) Notice: Subject to any disclaimer, the term of this patent is extended or adjusted under 35 U.S.C. 154(b) by 0 days.

(21) Appl. No.: 11/299,133

(22) Filed: Dec. 12, 2005

(65) Prior Publication Data

US 2006/0143935 A1    Jul. 6, 2006

Related U.S. Application Data

(60) Provisional application No. 60/636,516, filed on Dec. 17, 2004.

(51) Int. Cl.
*G01B 1/00* (2006.01)
(52) U.S. Cl. .............................. 33/506; 33/810; 42/1.01
(58) Field of Classification Search .................. 33/506, 33/833, 832, 810, 836, 811, 812, DIG. 1; 42/1.01
See application file for complete search history.

(56) References Cited

U.S. PATENT DOCUMENTS

| | | | | |
|---|---|---|---|---|
| 8,307 | A * | 8/1851 | Hosley ......................... | 33/810 |
| 82,969 | A * | 10/1868 | Mayott ........................ | 33/811 |
| 613,684 | A * | 11/1898 | Kienast ....................... | 33/810 |
| 735,935 | A * | 8/1903 | Blllings ....................... | 33/812 |
| 2,121,982 | A | 6/1938 | Pugsley | |
| 2,312,222 | A | 2/1943 | Tanner | |
| 2,502,613 | A | 4/1950 | Zanolio | |
| 3,063,184 | A | 11/1962 | Sukala, Jr. | |
| 3,600,814 | A | 8/1971 | Smith | |
| 4,203,227 | A * | 5/1980 | Giroux ................... | 33/DIG. 1 |
| 4,229,883 | A * | 10/1980 | Kobashi ....................... | 33/810 |
| 4,604,808 | A * | 8/1986 | Jeannet et al. ................ | 33/810 |
| 4,653,194 | A * | 3/1987 | Kim ....................... | 33/DIG. 1 |
| 5,375,337 | A * | 12/1994 | Butler ......................... | 33/506 |
| 5,433,011 | A * | 7/1995 | Scarborough et al. ........ | 33/376 |
| 5,491,907 | A | 2/1996 | Vidmar | |
| 5,570,513 | A | 11/1996 | Peterson | |
| 5,604,989 | A | 2/1997 | Stevenson | |
| 5,960,576 | A | 10/1999 | Robinson | |
| 6,041,510 | A * | 3/2000 | Huff ............................ | 33/374 |
| 6,546,634 | B2 * | 4/2003 | Ming ...................... | 33/27.032 |
| 6,604,289 | B2 | 8/2003 | Nikolov | |
| 6,718,645 | B2 | 4/2004 | Berger | |
| 6,766,583 | B2 | 7/2004 | Economaki | |
| 2002/0121025 | A1* | 9/2002 | Leite ........................... | 33/374 |

* cited by examiner

*Primary Examiner*—G. Bradley Bennett
*Assistant Examiner*—Travis M. Reis
(74) *Attorney, Agent, or Firm*—Mark E. Pochal, Esq.

(57) ABSTRACT

A firearm measuring device for measuring all external dimensions of a firearm is comprised of an elongated rectangular caliper body member having measurement indicia inscribed thereon. A pair of jaws affixed on the caliper body member, one jaw affixed to a carriage and moveable along the caliper body member, a second jaw permanently affixed at one end of the caliper body member. A drop meter affixed to the caliper body member adjacent to the fixed jaw and vertically adjustable along the length of the drop meter by a channel within the length of the drop meter. The drop meter having a measurement indicia inscribed thereon. An extension member for attachment to the caliper body member having a bottom tooth-shaped configuration which is positioned on a gun barrel. The extension member having a magnetic means recessed within the extension member for securing the extension member in combination with the caliper body to the gun barrel eliminating need of holding the device during operation.

17 Claims, 4 Drawing Sheets

GAUGE FOR MEASURING GUN DIMENSIONS

This application claims benefit of provisional application Ser. No. 60/636,516, filed Dec. 17, 2004.

TECHNICAL FIELD

The present invention relates to devices for measuring external dimensions of guns or firearms for proper fitting to the individual user.

BACKGROUND OF THE INVENTION

The proper gun fit to an individual user is necessary for accurate and proficient shooting. Being able to measure all the external dimensions of a gun is the single essential aspect of a proper gun fit. The external dimensions referred to are: length of pull; drop at comb and heal; angle of pitch and cast.

One problem which this present invention addresses is that taking these measurements is tedious and difficult and requires multiple individuals for accurate measurements. Another problem is the necessity of requiring multiple devices to take all the external measurements of the gun. Consequently, many gun or firearm enthusiasts' purchase and use guns or firearms that do not properly fit their unique physical characteristics which affects their ability to become proficient and accurate in hitting the target, whatever that may be.

The present invention provides a new concept in the method of measuring the personal fit dimensions of a firearm with a single device that combines all the disciplines required for all accurate measurements required to measure and/or fit a gun, all within the capabilities of a single operator.

SUMMARY OF THE INVENTION

An object of the invention is to provide a single device capable of accurately measuring all the external dimensions of a gun for setup, and repeatability on guns with adjustable combs and pads.

A further object is to provide a device adaptable for use on any gun type with varying barrel lengths.

A further object is to provide a device capable of use by a single person.

A further object is to provide a device that is affordable and easy to use by the average recreational gun shooter to measure his or her firearms like custom gunsmiths.

A further object is to provide a device constructed of a durable light weight material that easily portable and affordably manufactured.

In accord with the invention, a device for measuring external dimensions of a firearm is comprised of a combo gauge having an elongated rectangular caliper body member having a first and second end, inscribed on one side with measurement indicia, a first jaw affixed at the first end of the caliper body member at a zero mark indicia, a moveable jaw attached by a carrier and moveable along the caliper body member to a plurality of linear distances from one another, a rectangular drop meter affixed perpendicular to the caliper body member at a position parallel to the fixed jaw, said drop meter having measurement indicia thereon and adjustable for vertical movement about the length of the drop meter, a rectangular extension member having a dovetail connection to the second end of the caliper body member. The extension member having a tooth-like configuration on a bottom edge for minimal contact with a firearm barrel and to avoid contact with a middle sight bead. Said extension member further having a magnetic means recessed within the tooth-like bottom edge for securing attachment of the extension member in combination with the caliber body member to the gun barrel making the combo gauge a stable measuring device to the gun barrel and eliminating the requirement to be held by hands.

The foregoing and other objects, features and advantages of the present invention will become more apparent from the following description of preferred embodiments and accompanying drawings.

DETAILED DESCRIPTION OF THE DRAWINGS

Figure 1:
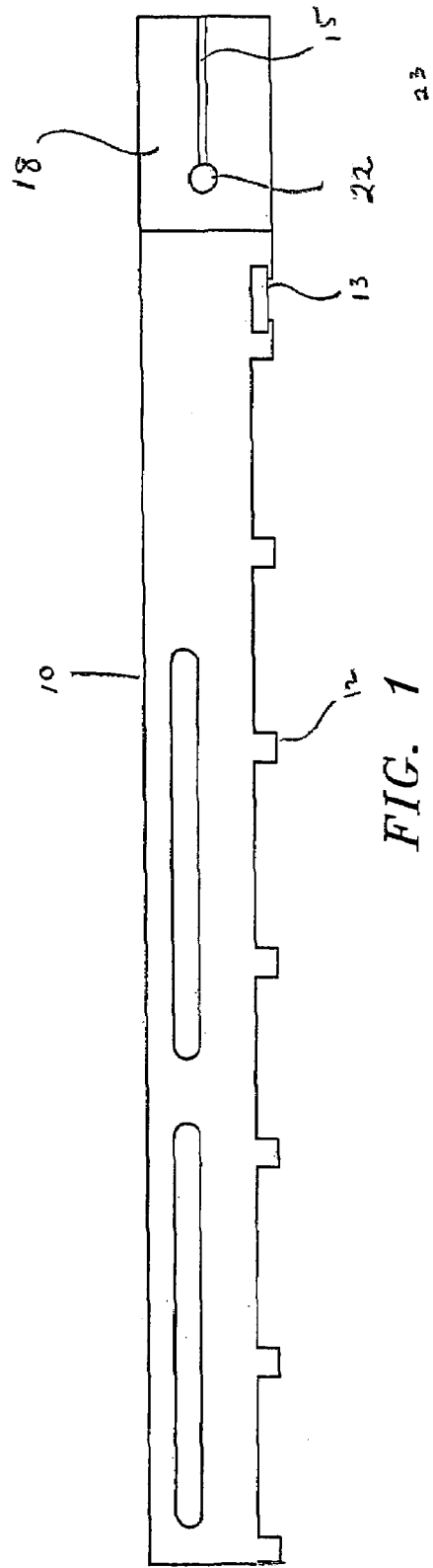
FIG. 1 is a perspective view of the extension member.
Figure 2:
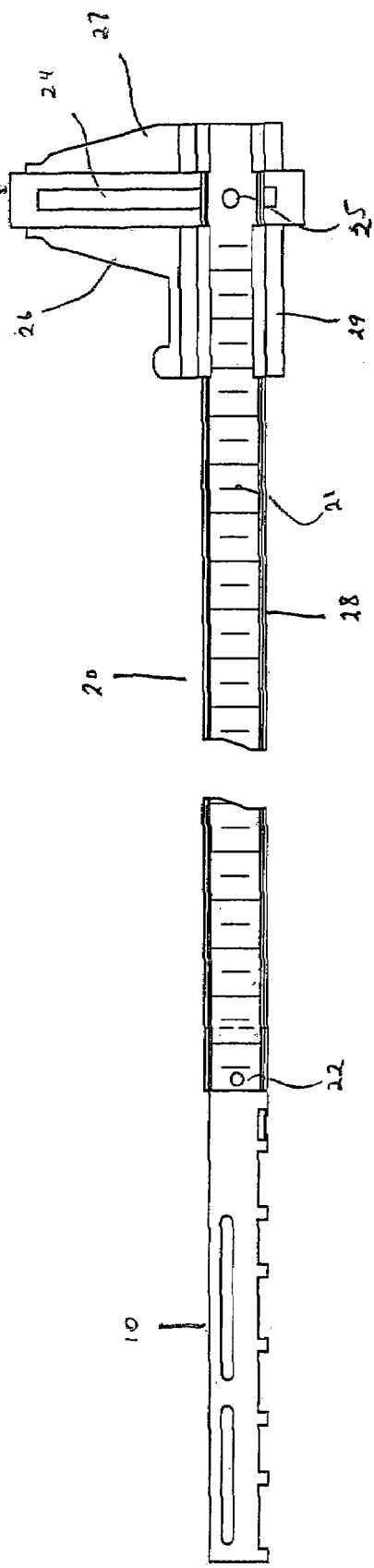
FIG. 2 is a perspective view of the extension member affixed to the caliper body member and the jaw members and drop meter.

The invention is principally described in FIG. 2 in terms of a combo gauge (20) having a first rectangular caliper body member (28) inscribed with measurement indicia, in metric and inches designations (21) on one side. A pair of jaw members (26, 27) positioned on the caliper body member (28). The first jaw member (27) is permanently affixed at one end of the caliper body member (28) at a zero measurement indicia on the caliper body member (28). A second jaw member (26) is moveable along the length of the caliper body member (28) by means of a carriage (29) affixed to the caliper body member (28). The carriage (29) having a threaded screw locking means (30) for securing the jaw in a desired location at a plurality of linear distances. A drop meter (23) is affixed to the caliper body member (28) at a position parallel and adjacent to the fixed jaw member (27). Said drop meter (23) having measurement indicia inscribed thereon. Said drop meter having a channel (24) along the length of the drop meter (23) for vertical movement along the channel and a locking means (25) on the caliper body member (28) for positioning the drop meter at a desired location.

The present invention further encompasses an extension member (10) having a means of attachment (22) at a second end of the caliper body member (28). The extension member (10) having a dovetail connection with caliper body member (28). The extension member further having a tooth-like configuration on a bottom edge (12) for positioning on a firearm barrel (36). The extension member further including a magnetic means (13) recessed within the bottom edge of the extension member (10) for securing the extension member to the gun barrel (36).

The caliper body member (28) is about 26 inches in length. The extension member (10) is about 23 inches in length and the drop meter (23) is about 6 inches in length. The caliper body member and extension member in combination is about 49 inches in length to permit application of this device to any type and length of firearm.

Figure 3:
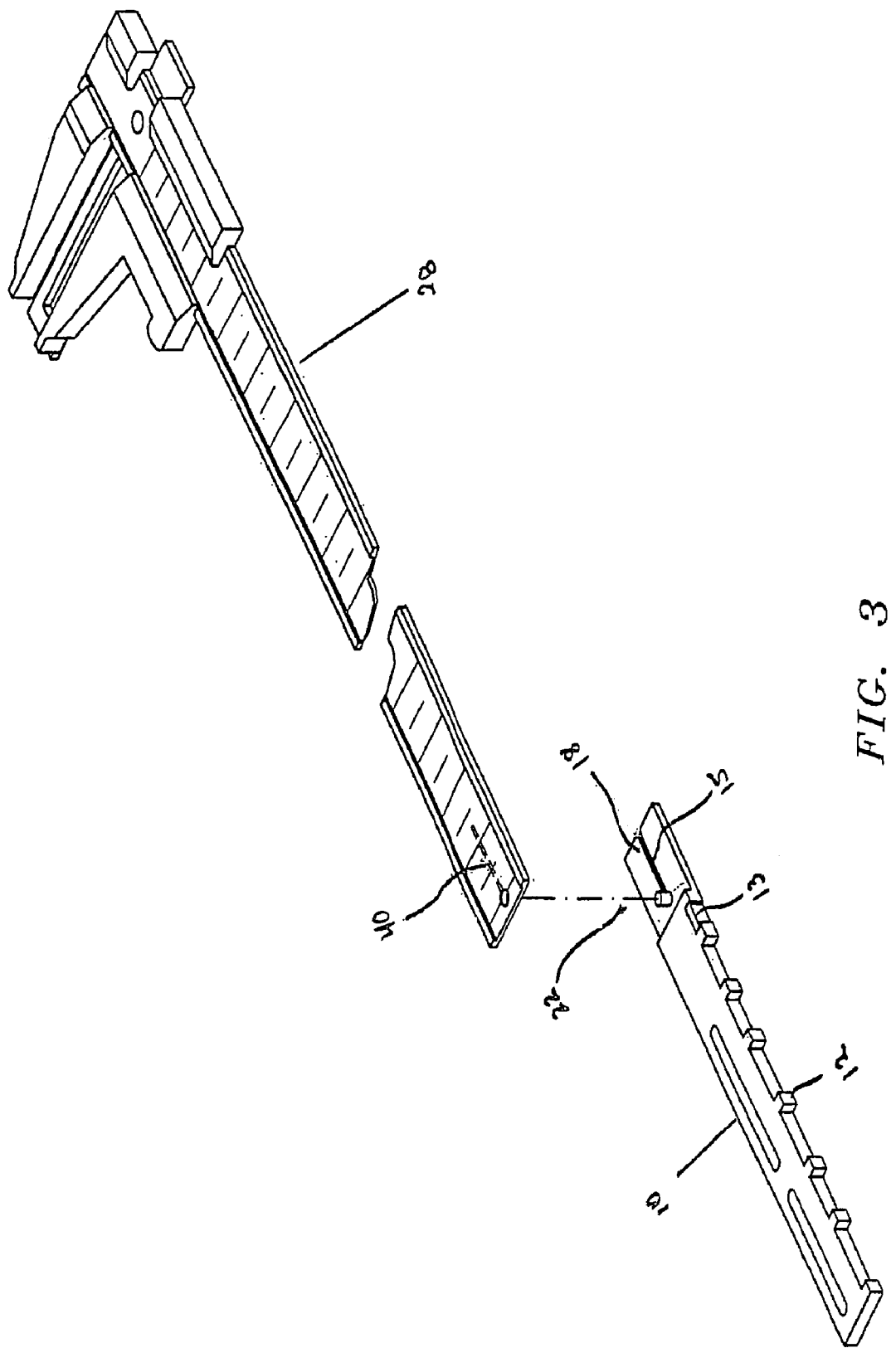
FIG. 3 is a vertical view of the dovetail connection of the caliper body member to the extension member.
Figure 4:
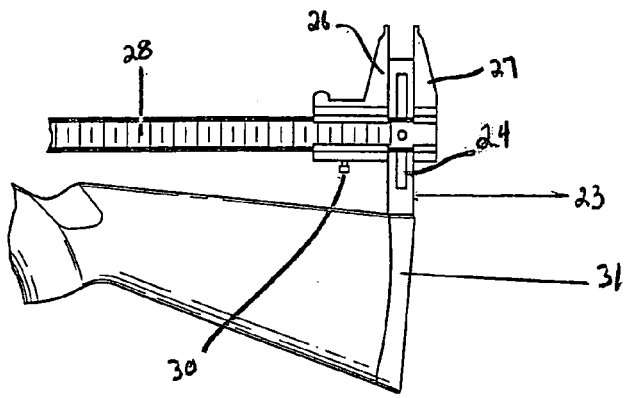
FIG. 4 is a partial cross section view of caliper gauge body and drop meter positioned at the heel of a firearm stock.

In further accord with the invention, FIG. 3 is illustrative of the preferred manner of attaching the extension member (10) to the caliper body member (28). Extension member (10) has a cut-out section (18), approximately the thickness of the caliper body member (28). Said cut-out section further having a gauge groove (15) for communication with a corresponding channel (40) in a second side of caliper body member (28) and secured together by a fastener means (22).

In the preferred embodiment the combo gauge (20) and extension member (10) are preferably constructed of a durable lightweight material, such as aircraft aluminum, but may be constructed of other metal materials.

In the preferred embodiment the drop meter (23) is constructed of steel, but may be constructed of other materials. Drop meter (23) has measurement indicia in inches inscribed on one side and measurement indicia in metric on a second side.

Figure 6:
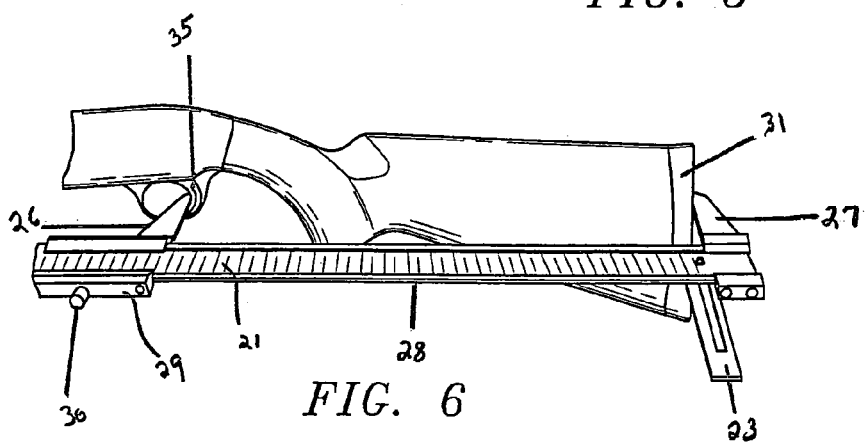
FIG. 6 is a partial view of the caliper jaws in an open position situated between a trigger of the firearm and the butt plate of the firearm.

In further accord with the invention, FIG. 6 is illustrative of measuring the length of pull of a gun or firearm. Drop meter (23) is positioned flush with the caliper body member (28) and the fixed jaw (27) is positioned against heel (31) at the zero mark. Jaw (27) and carriage (29) are moved a distance along caliper body member (28) to a position which jaw (27) is in contact with a trigger (35). Carriage (29) is locked in position and measurement is read from indicia (21).

Figure 8:
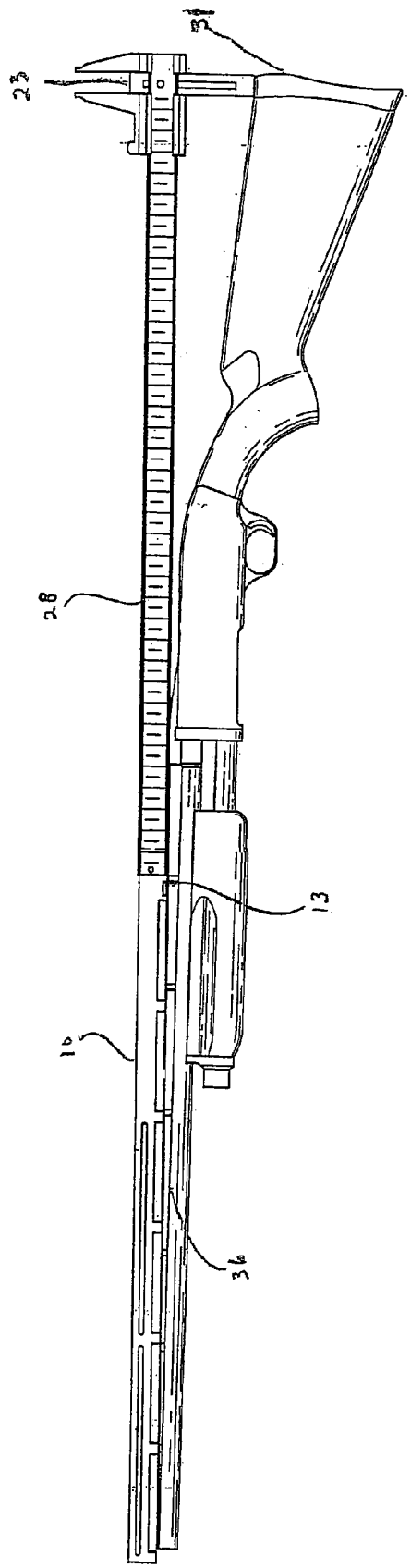
FIG. 8. is a full view of the extension member affixed to the gauge caliper body secured to the gun barrel by a magnetic means recessed in the extension member.

In further accord with the invention, FIG. 8 is illustrative of measuring the drop at the gun stock heel. Extension member (10) is attached to caliper body member (28) and said extension member (10) in combination with caliper body member (28) is positioned on a gun barrel (36) and secured to gun barrel by the magnetic means (13). Drop meter (23) is positioned at the gun stock heel (31) and adjusted to a position in contact with top of said heel and measured by the indicia thereon.

Figure 5:
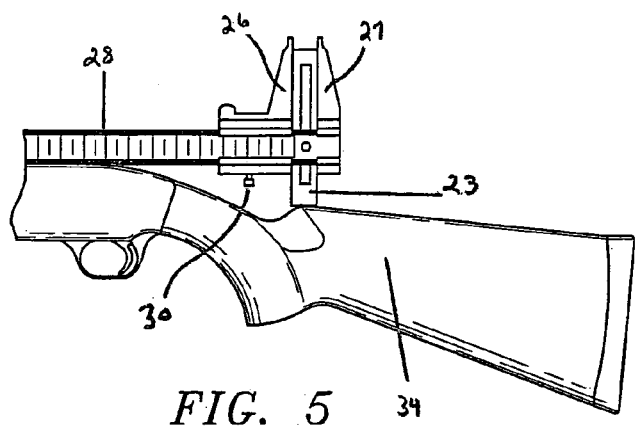
FIG. 5 is a partial cross section of the caliper gauge body positioned on a firearm and drop meter positioned at the comb of the firearm stock.

Measuring the drop at the gun stock comb is illustrated in FIG. 5. Caliper body member (28) is positioned on gun barrel (36) at a point which drop meter (23) is in contact with top of comb (34). Measurement is recorded by the indicia thereon drop meter (23).

Figure 7:
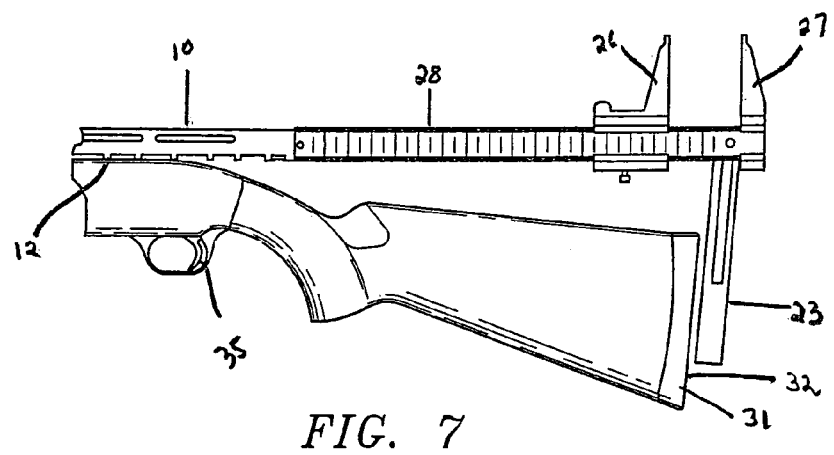
FIG. 7 is a partial view of the extension member positioned on a barrel of the firearm and attached to the caliper body and the drop meter positioned against the butt plate of the firearm stock measuring actual angle of pitch.

In further accord with the invention, FIG. 7 is illustrative of measuring the angle of pitch. The caliper body member (28) in combination with extension member (10) is affixed on gun barrel (36). Drop meter (23) is extended the entire length downward and positioned parallel to a butt plate (32) and secured in position. The caliper body member (28) and extension member (10) is removed from gun and the angle of the drop meter is then measured with a commercial protractor supplied.

Figure 9A:
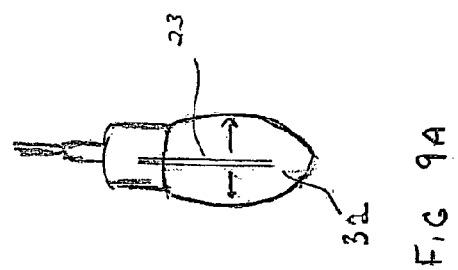
FIG. 9a. is a cross-section of the butt plate and the drop meter positioned midline for measurement of the cast of the butt plate.
Figure 9:
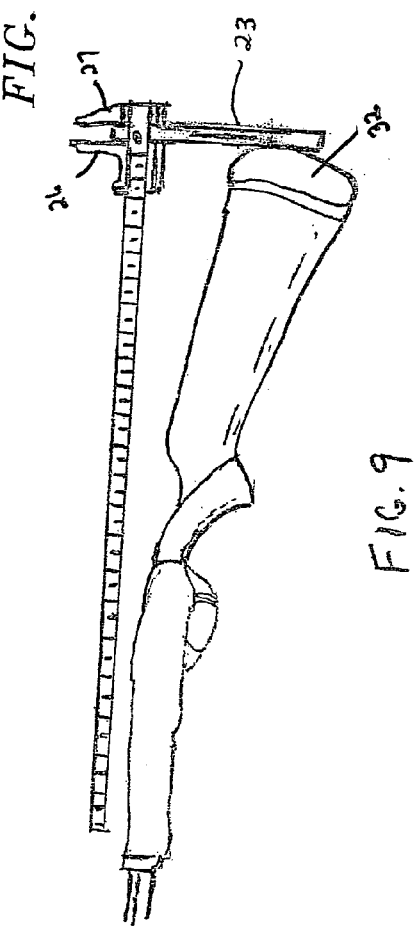
FIG. 9. is a isolated view of the drop meter positioned at the centerline on the firearm butt plate for measuring the distance of the butt plate from either side of the drop meter.

In further accord with the invention, FIG. 9 is illustrative of measuring the cast of a firearm. Gun stocks may be bent to better fit to a shooter's face. Cast off is indicative of a right handed shooter as the gun stock is bent away from the shooter's face. Cast on is for left handed shooters and indicates a left bend of the gun stock away from the shooter's face. Cast is measured by positioning drop meter (23) at the center line of the gun stock butt plate (32) as represented in FIG. 9*a*. and recording the distance from the center line of drop meter (23) to the outward surface of the gun stock on the right and left sides.

Although this invention has been shown and described with respect to some embodiments, it will be understood by those skilled in this art that various changes in form and detail thereof may be made without departing from the spirit and scope of the claimed invention.

I claim:

1. A firearm measuring device, useable on a barrel of a firearm providing a plurality of measurement indicia contained within, for measuring all external dimensions of the firearm, the firearm measuring device comprising:
    an elongated rectangular caliper body member having two ends and measurement indicia inscribed thereon one side;
    a pair of jaws, said first jaw permanently affixed at one end of the caliper body member, said second jaw further attached to a carriage positioned on the caliper body member and slidable along the length of the caliper body member;
    a rectangular drop meter positioned adjacent to the fixed jaw, said drop meter having a channel within the length of the drop meter and a fastening means to the caliper body member for vertical upward and downward adjustment, said drop meter further having measurement indicia inscribed thereon;
    a rectangular extension member having a bottom edge consisting of a plurality of tooth-shaped configurations, said extension member having a means for attachment to the second end of the caliper body member and;
    a means for securing the rectangular extension member in combination with the caliper body member to the barrel of the firearm.

2. The firearm measuring device of claim 1, wherein the extension member has a cut-out portion at one end approximately the thickness of the caliper body member for communication with the caliper body member.

3. The firearm measuring device of claim 2, wherein the cut-out portion contains a extension guide extending from a hole to the end of said cut-out portion for communication with a gauge groove in the caliper body member on a second side.

4. The firearm measuring device of claim 2, wherein the cut-out portion is about 3 inches in length.

5. The firearm measuring device of claim 1, wherein the means for attachment of the extension member to the caliper body member is a bolt and a nut.

6. The firearm measuring device of claim 1, wherein the caliper body member is about 26 inches in length.

7. The firearm measuring device of claim 1, wherein the measurement indicia inscribed on the caliper body member is inches.

8. The firearm measuring device of claim 1, wherein the measurement indicia inscribed on the caliper body member is metric.

9. The firearm measuring device of claim 1, wherein the extension member is about 23 inches in length.

10. The firearm measuring device of claim 1, wherein the caliper body member and the extension member are constructed of an aircraft aluminum material.

11. The firearm measuring device of claim 1, wherein the drop meter is constructed of steel.

12. The firearm measuring device of claim 1, wherein the drop meter is about 6 inches in length.

13. The firearm measuring device of claim 1, wherein the measurement indicia inscribed on the drop meter is inches.

14. The firearm measuring device of claim 1, wherein the measurement indicia inscribed on the drop meter is metric.

15. The firearm measuring device of claim 1, wherein the drop meter has a channel extending the length of the drop meter for vertical adjustment along the channel.

16. The firearm measuring device of claim 1, wherein the means for securing the rectangular extension member in combination with the caliper body member to the barrel of the firearm is a magnet.

17. The firearm measuring device of claim 16, wherein the magnet is recessed within the bottom edge between the tooth-shaped configurations of the extension member about ½ inches with approximately 0.025 inch clearance on said bottom edge to prevent scratching a gun surface.

* * * * *